Patented Feb. 26, 1929.

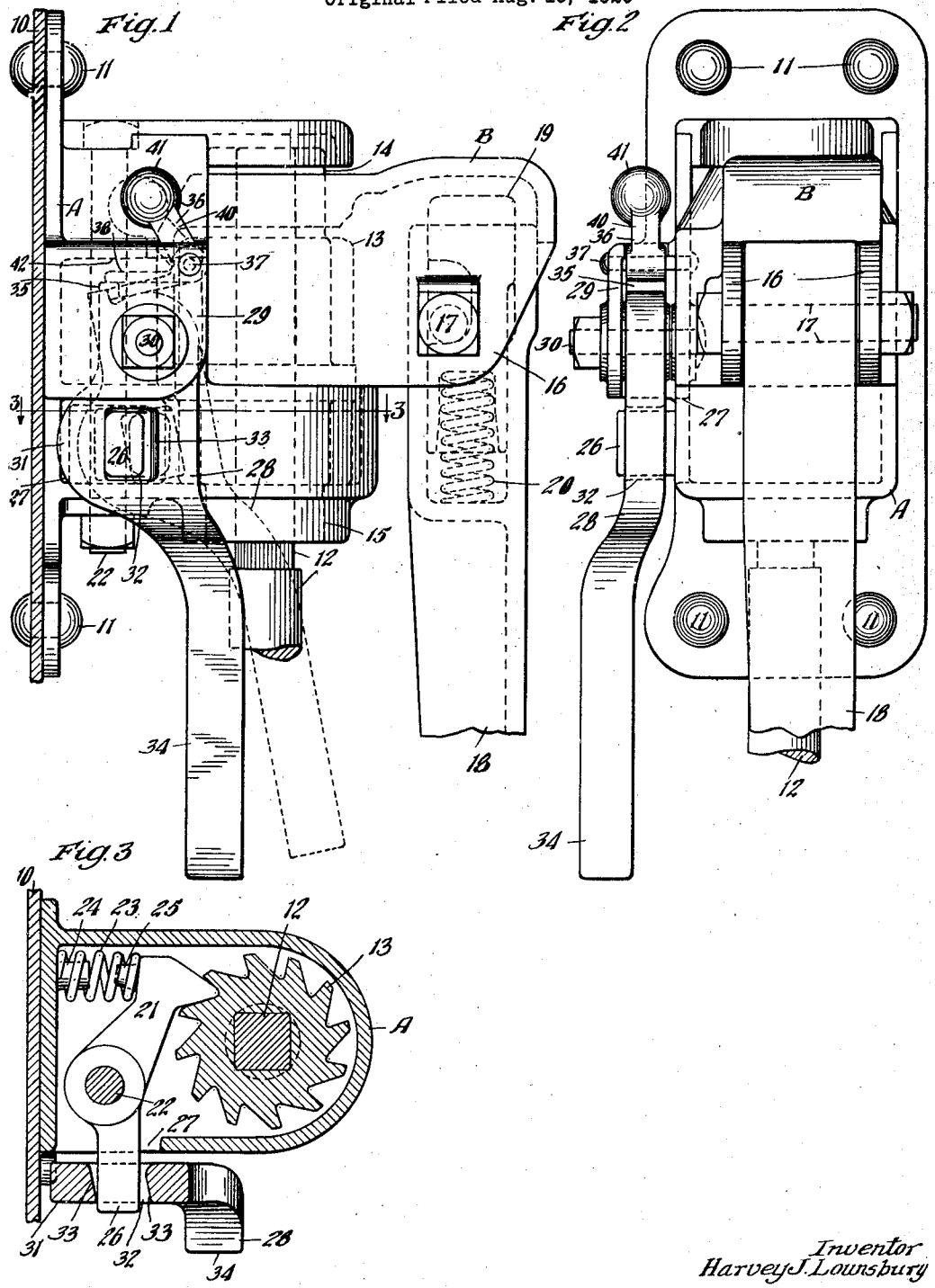

1,703,314

UNITED STATES PATENT OFFICE.

HARVEY J. LOUNSBURY, OF GLEN ELLYN, ILLINOIS, ASSIGNOR TO W. H. MINER, INC., OF CHICAGO, ILLINOIS, A CORPORATION OF DELAWARE.

HAND BRAKE FOR RAILWAY CARS.

Application filed August 19, 1925, Serial No. 51,100. Renewed July 13, 1928.

This invention relates to improvements in hand brakes for railway cars.

An object of the present invention is to provide a hand brake of the vertical staff type, including ratchet mechanism for winding the staff and a locking dog for preventing reverse rotation thereof, in conjunction with a release lever for the locking dog operable in a plane substantially parallel with the plane of the staff, and in which means are provided for positively moving said dog in a direction to place the same in operative engagement, and also in a direction to disengage the same, together with means for automatically latching the release lever and dog out of operating engagement when the lever is moved in a releasing direction, to thereby permit complete unwinding of the brake chain.

Other and further objects of the invention will more fully and clearly appear from the description and claims hereinafter following.

In the drawing forming part of this specification, Figure 1 is a vertical sectional view through the end wall of the car, showing a side elevation of the hand brake mechanism with my improvements incorporated therein. Figure 2 is a front elevation of said brake mechanism, and Figure 3 is a horizontal sectional view of the invention on the line 3—3 of Figure 1.

In said drawing the end wall of the car is indicated at 10, to which is secured a housing or bearing bracket designated generally by the reference character A. The housing A is secured to the wall 10 by suitable rivets 11, and projecting into the housing is the usual vertical brake staff, a portion of which is indicated at 12, the staff having a squared or other non-circular cross-section at the top thereof, on which is rigidly fitted a ratchet wheel indicated in dotted lines at 13, the ratchet wheel being suitably mounted in the housing by journals 14 and 15. Oscillatably mounted upon the journal member 14 is a carrier or fulcrum member designated generally by the reference character B. The carrier B is provided with laterally extending wings 16, and pivotally mounted between the wings 16, on the horizontal bolt 17 is an operating handle or lever 18. The handle 18 is provided at the top thereof with a socket in which is slidably mounted a pawl 19 normally impelled outwardly by means of the spring 20. The arrangement of the handle and pawl is such that when the handle is elevated to a horizontal position, the pawl is operatively engaged with the ratchet wheel 13, and when the handle is released, it automatically falls to a depending vertical inoperative position. All of the above described construction is old and well known and no claim is made thereto, except in combination with novel means for preventing accidental reverse rotation of the staff, which means will be now referred to.

To hold the staff 12 against accidental rotation, a locking dog 21 is provided pivotally mounted upon the bolt 22 disposed in the housing A, said dog being adapted to engage the lower end of the ratchet wheel 13, the dog 21 being normally urged to engaged position with the ratchet wheel 13 by means of a coiled spring 23, one end of which is disposed about the lug 24 formed on the inner wall of the housing, and the other end of which is disposed about the lug 25 formed on the end of the dog 21, as best shown in Figure 3. The dog 21 on the side of the pivot bolt 22 opposite to the engaging portion is provided with a short lever extension 26, which projects outwardly from the housing A through a slot 27 therein, the extension 26 being of considerably less length than is usually provided in brakes of this character, and is shortened to prevent projection an excessive distance from the side of the bracket, and is adapted to be operated by the release lever indicated generally by the reference numeral 28, said lever 28 being arranged to be operated in a plane substantially parallel with the staff 12 in a manner which now will be described.

In order to mount the lever 28 for its operative movements, the housing A is provided with an integral offset member providing a wall 29 spaced from the side wall of the bracket, one end of the lever 28 being disposed between the wall 29 and the adjacent wall of the bracket A, and pivotally mounted upon a bolt 30, extending through the wall 29, and the adjacent wall of the bracket A, said bolt being disposed at an angle to the axis of the staff 12, whereby the lever 28 swings in a plane substantially parallel with the plane of the staff 12. The lever 28 depends from the bolt 30 within the plane of the extension 26 of the locking dog 21, and at this point is preferably provided with a widened portion as indicated at 31, the portion 31 having an aperture 32 therein adapted to loosely accommodate the extension 26 of the dog 21, the walls 33 defining the aperture 32 being inclined as best shown in Figure 3, whereby angular movement of the extension 26 is permitted with respect to the lever 28, when swung to operate the dog 21. Below the portion 31, the lever 28 is offset to provide an extension 34 forming a handle by which the lever may be swung toward and from the wall 10 of the car, for releasing and permitting engagement of the dog 21.

In connection with the release lever 28 means are provided for automatically locking the release lever to hold the dog 21 entirely free of engagement with the ratchet wheel 13 when the release lever 28 is moved in a direction to release the dog 21. Said means include a lug 35 upon the upper end of the lever 28, which is adapted to co-operate with an automatically operable latch 36. The latch 36 is substantially in the form of a bell crank lever, the elbow of which is pivotally mounted upon a pin 37 extending through the wall 29 of the extension on the housing A, and the adjacent wall of said housing, the end 38 of the arm of said bell crank lever being adapted to co-operate with the lug 35 on the upper end of the lever 28. The remaining arm 40 of the bell crank lever is preferably of heavier construction than the arm 38, and at the end of the arm 40 an enlargement 41 is provided, the arrangement being such that the arm 38 is normally urged in a counterclockwise direction by the weight of the portion 41, movement of the arm 38 in a clockwise direction being limited by engagement with the upper wall 42 of the extension upon the housing A.

In operation when it is desired to wind the brake staff in a direction to set the brakes, the lever 18 is raised from its normal depending position to a horizontal position, causing engagement of the pawl 19 with the ratchet wheel 13, oscillation of the lever causing rotation of the ratchet wheel in a clockwise direction. During this movement accidental retrograde rotation of the staff is prevented by the engagement of the dog 21 which is normally held against the ratchet wheel 13 by the spring 23. The lever 28 during the winding of the brake hangs in its depending position, and due to the loose fit of the aperture 32 with the extension 26, ratcheting of the dog 21 is permitted. With the lever 28 in this position, it will be noted that the outer end of the arm 38 of the latching mechanism rests upon the top surface of the lug 35. When it is desired to release the brakes, the lever 28 is manually pulled in a direction away from the wall 10 and during this action the inner wall of the aperture 32 in the lever 28 will engage the extension 26, and move the same in a counter-clockwise direction, thereby disengaging the dog 21 from the ratchet wheel 13. During this movement the lug 35 on the upper end of the lever 28 will pass out of engagement with the arm 38 of the latch mechanism, permitting the arm to move downwardly under the influence of the weighted portion 41, so that return movement of the lever 28 is automatically prevented, and thus the dog 21 is held entirely free of the ratchet 13, and permits the unobstructed unwinding of the brake chain. In order to re-engage the dog 21 when it is again desired to set the brakes, the weighted portion 41 is pulled in a clockwise direction, retracting the end of the arm 38 from behind the lug 35 on the lever 28, after which the lever 28 will return to its normal depending position, and in its returning movement aid the spring in urging the dog 21 into engagement with the ratchet 13.

While I have herein shown and described what I now consider the preferred manner of carrying out my invention, the same is merely illustrative, and I contemplate all changes and modifications that come within the scope of the claims appended hereto.

I claim:

1. In a hand brake, the combination with a member adapted to be rotated to effect tightening of a brake chain; of a ratchet wheel rotatable with said member; a pivoted locking dog co-operable with said ratchet wheel, said dog being normally urged to operative position, and having an extension thereon; and mechanism for operating said dog, said mechanism being mounted to swing about an axis at an angle to the axis of rotation of said member, and provided with walls disposed on opposite sides of said extension and adapted to co-operate therewith for operating said dog when said mechanism is actuated.

2. In a hand brake, the combination with a rotatable element adapted to have a brake chain wound thereon; of a toothed member rotatable with said element; a device for permitting rotation of said member in one direction and preventing rotation in a reverse direction, said device being provided with an extension by which the same may be moved into and out of engaged position, and including means normally urging the same to engaged position; and mechanism mounted to swing in a plane substantially parallel with said rotatable element, said mechanism being constructed to normally hang in depending position, and provided with walls disposed on opposite sides of said extension and adapted to co-operate therewith for operating said device when said mechanism is actuated, the depending position of said mechanism and said walls being arranged to permit normal movements of said device when co-operating with said toothed member.

3. In a hand brake, the combination with a rotatable brake winding member; of a toothed element carried thereby; a holding device arranged to permit rotation of said element in one direction and preventing reverse rotation thereof, said device having means by which the same may be moved out of engagement with said toothed element; release mechanism arranged to swing about an axis at an angle to the axis of rotation of said winding member to release said holding device; and means for automatically locking said release mechanism when moved in a releasing direction.

4. In a hand brake, the combination with a rotatable brake staff having mechanism associated therewith for winding said staff and preventing reverse rotation thereof and including a pawl, said pawl being provided with means by which the same may be released to permit unwinding of said brake staff; and a locking mechanism including a latch normally resting upon said means when said means are in position to permit operative engagement of said pawl, said latch and said means being arranged whereby upon movement of said means to release said pawl, said latch automatically moves into engagement with portions of said pawl releasing means to restrain the same against return movement.

5. In a hand brake, the combination with a housing; of a ratchet element journaled in said housing; a brake staff connected with said ratchet wheel; an oscillatable member; ratchet means adapted to rotate said ratchet wheel upon oscillation of said oscillatable member; a locking dog pivotally mounted in said housing and normally urged into engagement with said ratchet; a releasing lever mounted to swing about an axis disposed at an angle to the axis of movement of said dog, and having means adapted to co-operate with said dog; and means for automatically locking said releasing lever when moved in a direction to release said dog.

6. In a hand brake, the combination with a housing; of a toothed member journaled in said housing; a brake staff connected with said toothed member; an oscillatable member including ratchet means adapted to rotate said toothed member upon oscillation of said oscillatable member; a locking dog pivotally mounted in said housing and adapted to normally ratchet over said toothed member and prevent reverse rotation thereof, said dog being provided with an extension; and a release lever swingable about an axis disposed at an angle to the pivotal axis of said dog, said lever being provided with walls disposed on opposite sides of said extension and adapted to co-operate therewith to operate said dog when said lever is actuated, said lever being constructed to depend in pre-determined position, and said walls associated with said lever, being arranged to permit normal ratcheting of said dog.

7. In a hand brake, the combination with a rotatable brake tightening element; of ratchet mechanism permitting rotation of said element in one direction and preventing reverse rotation thereof, said mechanism including a movable pawl normally urged to operative position in one direction and adapted to be released by movement in an opposite direction; a lever pivotally mounted to move in a plane disposed at an angle to the plane of movement of said pawl, said lever having means for engagement with said pawl to release the same; and locking mechanism for securing said lever in released position, said means including a latch element normally urged toward said lever and resting on a portion thereof to be maintained in inoperative position, said latch, upon movement of said release lever to release said dog, being arranged to automatically assume a position in engagement with a portion of said lever to maintain the same against return to normal position.

8. In a hand brake, the combination with a housing provided with a wall spaced outwardly from the side wall thereof; of a ratchet element journaled in said housing; a brake staff connected with said ratchet element; an oscillatable member including ratchet means adapted to rotate said ratchet wheel upon oscillation of said oscillatable member; a locking dog pivotally mounted in said housing and normally urged into engagement with said ratchet, said locking dog being provided with an extension; a release lever having one end disposed between said spaced wall and the adjacent wall of said housing, and pivotally mounted therein to swing about an axis at an angle to the pivotal axis of said dog, said lever being provided with means for engagement with the extension on said locking dog for controlling the movements thereof.

9. In a hand brake, the combination with a housing provided with an integral wall spaced outwardly from the side wall of said housing; of a ratchet element journaled in said housing; a brake staff connected with said ratchet element; an oscillatable member including ratchet means adapted to rotate said ratchet wheel upon oscillation of said oscillatable member; a locking dog pivotally mounted in said housing and normally urged into engagement with said ratchet, said locking dog being provided with an extension; a release lever having one end disposed between said spaced wall and the adjacent wall of said housing, and pivotally mounted therein, said lever being provided with means for engagement with the extension on said locking dog for controlling the movements thereof, and a latch pivotally mounted between said spaced wall and the wall of said housing and adapted to co-operate with said lever to lock the same when moved in a direction to release said dog.

In witness that I claim the foregoing I have hereunto subscribed my name this 15th day of August, 1925.

HARVEY J. LOUNSBURY.